United States Patent
Cho

(10) Patent No.: US 8,839,024 B2
(45) Date of Patent: Sep. 16, 2014

(54) SEMICONDUCTOR STORAGE DEVICE-BASED DATA RESTORATION

(75) Inventor: Byungcheol Cho, Seochogu (KR)

(73) Assignee: Taejin Info Tech Co., Ltd., Seoul (KR)

( * ) Notice: Subject to any disclaimer, the term of this patent is extended or adjusted under 35 U.S.C. 154(b) by 403 days.

(21) Appl. No.: 13/188,649

(22) Filed: Jul. 22, 2011

(65) Prior Publication Data

US 2013/0024594 A1    Jan. 24, 2013

(51) Int. Cl.
*G06F 11/00* (2006.01)
*G06F 11/14* (2006.01)

(52) U.S. Cl.
CPC ........ *G06F 11/1417* (2013.01); *G06F 11/1441* (2013.01)
USPC .............................. 714/6.1; 714/6.24; 714/6.3

(58) Field of Classification Search
None
See application file for complete search history.

(56) References Cited

U.S. PATENT DOCUMENTS

| | | | | |
|---|---|---|---|---|
| 7,984,316 B2* | 7/2011 | Kaler | ........................... | 713/340 |
| 2006/0152981 A1* | 7/2006 | Ryu | .............................. | 365/194 |
| 2008/0282264 A1* | 11/2008 | Chen et al. | ..................... | 719/320 |
| 2011/0072430 A1* | 3/2011 | Mani | ................................ | 718/1 |
| 2012/0192038 A1* | 7/2012 | Cho | .............................. | 714/770 |
| 2012/0210163 A1* | 8/2012 | Cho | ............................. | 714/6.21 |
| 2013/0111104 A1* | 5/2013 | Kim | ............................. | 711/103 |

OTHER PUBLICATIONS

Microsoft Computer Dictionary, 4th Ed., Microsoft Press, 1999, p. 142.*

* cited by examiner

*Primary Examiner* — Christopher McCarthy
(74) *Attorney, Agent, or Firm* — Saliwanchik, Lloyd & Eisenschenk

(57) ABSTRACT

Embodiments of the invention provide a device and method for warm booting whereby data restoration occurs at the powering-on of the host, and can therefore be performed by the boot disk. Specifically, when the system is powered on, a backup controller will send a notification to a DMA controller indicating the data restoration is needed. The backup controller will automatically resorts contents of a backup storage device to main memory. During the process, when the host requests data, the DMA controller reads the data from the backup storage unit and sends it to the host. Then, once data restoration is complete, normal operations can commence.

17 Claims, 4 Drawing Sheets

SEMICONDUCTOR STORAGE DEVICE-BASED DATA RESTORATION

CROSS-REFERENCE TO RELATED APPLICATION

This application is related in some aspects to commonly-owned, co-pending application Ser. No. 12/758,937, entitled "SEMICONDUCTOR STORAGE DEVICE", filed on Apr. 13, 2010, the entire contents of which are herein incorporated by reference.

FIELD OF THE INVENTION

The present invention relates to a semiconductor storage device (SSD) of a PCI-Express (PCI-e) type. Specifically, the present invention relates to a SSD-based data restoration (e.g., warm booting) method and device enabling the same.

BACKGROUND OF THE INVENTION

As the need for more computer storage grows, more efficient solutions are being sought. As is known, there are various hard disk solutions that store/read data in a mechanical manner as a data storage medium. Unfortunately, data processing speed associated with hard disks is often slow. Moreover, existing solutions still use interfaces that cannot catch up with the data processing speed of memory disks having high-speed data input/output performance as an interface between the data storage medium and the host. Therefore, there is a problem in the existing area in that the performance of the memory disk cannot be property utilized.

SUMMARY OF THE INVENTION

Embodiments of the invention provide a device and method for warm booting whereby data restoration occurs at the powering-on of the host, and can therefore be performed by the boot disk. Specifically, when the system is powered on, a backup controller will send a notification to a DMA controller indicating the data restoration is needed. The backup controller will automatically resorts contents of a backup storage device to main memory. During the process, when the host requests data, the DMA controller reads the data from the backup storage unit and sends it to the host. Then, once data restoration is complete, normal operations can commence.

A first aspect of the present invention provides a method for semiconductor storage device (SSD)-based data restoration, comprising: a host interface unit; sending a notification from a backup controller to a DMA controller indicating that data restoration is needed, the notification occurring in response to a powering on of a SSD memory disk unit; automatically restoring data from a backup storage unit coupled to the backup controller in response to the notification; and sending the data from the DMA controller to a host in response to a request received from the host.

A second aspect of the present invention provides a semiconductor storage device (SSD) memory disk unit, comprising: a host interface for coupling the SSD memory disk unit to a host; a DMA controller coupled to the host interface; a backup controller coupled to the DMA controller; and a backup storage unit coupled to the backup controller, wherein a notification is communicated from the backup controller to the DMA controller upon a powering-on of the SSD memory disk unit, and wherein the backup controller automatically restores data from the backup storage unit in response to the notification.

A third aspect of the present invention provides a semiconductor storage device (SSD)-based system, comprising: at least one SSD memory disk unit comprising a DMA controller, a backup controller coupled to the DMA controller, and a backup storage unit coupled to the backup controller; a RAID controller coupled to the at least one SSD memory disk unit; a controller coupled to the RAID controller, wherein a notification is communicated from the backup controller to the DMA controller upon a powering-on of the at least one SSD memory disk unit, and wherein the backup controller automatically restores data from the backup storage unit in response to the notification.

BRIEF DESCRIPTION OF THE DRAWINGS

These and other features of this invention will be more readily understood from the following detailed description of the various aspects of the invention taken in conjunction with the accompanying drawings in which.

Figure 1:
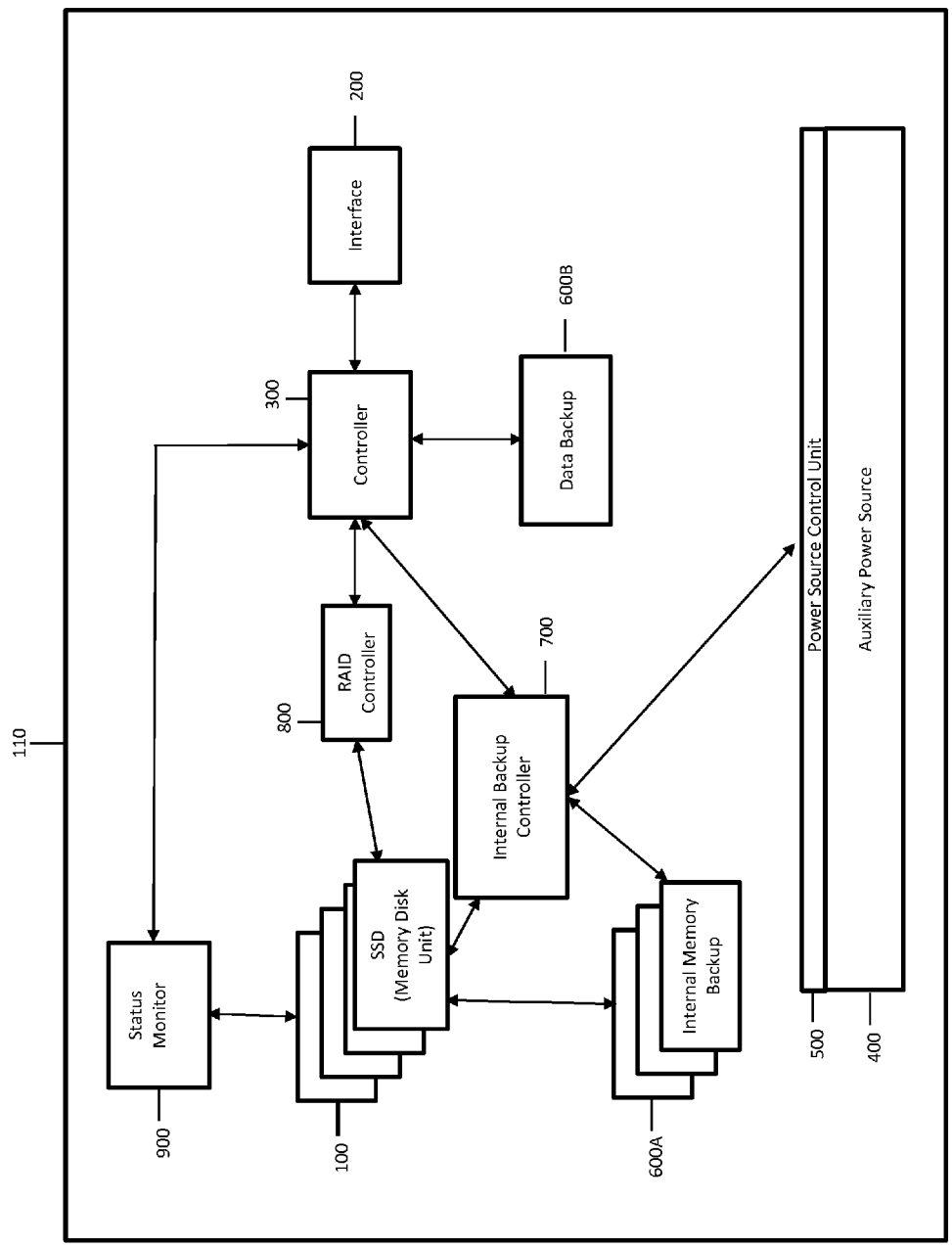
FIG. 1 is a diagram illustrating a configuration of a storage device of a PCI-Express (PCI-e) type according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments will now be described more fully herein with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limited to this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Moreover, as used herein, the term RAID means redundant array of independent disks (originally redundant array of inexpensive disks). In general, RAID technology is a way of storing the same data in different places (thus, redundantly) on multiple hard disks. By placing data on multiple disks, I/O (input/output) operations can overlap in a balanced way, improving performance. Since multiple disks increase the mean time between failures (MTBF), storing data redundantly also increases fault tolerance.

Unless otherwise defined, all terms (including technical and scientific terms) used herein have the same meaning as commonly understood by one of ordinary skill in the art. It will be further understood that terms such as those defined in commonly used dictionaries should be interpreted as having a meaning that is consistent with their meaning in the context of the relevant art and the present disclosure, and will not be interpreted in an idealized or overly formal sense unless expressly so defined herein.

Hereinafter, a storage device of a PCI-Express (PCI-e) type according to an embodiment will be described in detail with reference to the accompanying drawings.

Embodiments of the invention provide a device and method for warm booting whereby data restoration occurs at the powering-on of the host, and can therefore be performed by the boot disk. Specifically, when the system is powered on, a backup controller will send a notification to a DMA controller indicating the data restoration is needed. The backup controller will automatically resorts contents of a backup storage device to main memory. During the process, when the host requests data, the DMA controller reads the data from the backup storage unit and sends it to the host. Then, once data restoration is complete, normal operations can commence.

The storage device of a PCI-Express (PCI-e) type supports a low-speed data processing speed for a host by adjusting synchronization of a data signal transmitted/received between the host and a memory disk during data communications between the host and the memory disk through a PCI-Express interface, and simultaneously supports a high-speed data processing speed for the memory disk, thereby supporting the performance of the memory to enable high-speed data processing in an existing interface environment at the maximum. It is understood in advance that although PCI-Express technology will be utilized in a typical embodiment, other alternatives are possible. For example, the present invention could utilize Serial Attached Small Computer System Interface (SAS)/Serial Advanced Technology Advancement (SATA) technology in which a SAS/SATA type storage device is provided that utilizes a SAS/SATA interface Referring now to FIG. 1, a diagram schematically illustrating a configuration of a PCI-Express type, RAID controlled semiconductor storage device (e.g., for providing storage for a serially attached computer device) according to an embodiment of the invention is shown. As depicted, FIG. 1 shows a RAID controlled PCI-Express type storage device 110 according to an embodiment of the invention which includes a SSD memory disk unit 100 (referred to herein as SSD memory disk unit, SSD, and/or SSD memory disk unit) comprising: a plurality of memory disks having a plurality of volatile semiconductor memories/memory units (also referred to herein as high-speed SSD memory disk units 100); a RAID controller 800 coupled to SSD memory disk units 100; an interface unit 200 (e.g., PCI-Express host) which interfaces between the SSD memory disk unit and a host; a controller unit 300; an auxiliary power source unit 400 that is charged to maintain a predetermined power using the power transferred from the host through the PCI-Express host interface unit; a power source control unit 500 that supplies the power transferred from the host through the PCI-Express host interface unit to the controller unit 300, the SSD memory disk units 100, the backup storage unit, and the backup control unit which, when the power transferred from the host through the PCI-Express host interface unit is blocked or an error occurs in the power transferred from the host, receives power from the auxiliary power source unit and supplies the power to the SSD memory disk unit through the controller unit; a backup storage unit 600A-B that stores data of the SSD memory disk unit; and a backup control unit 700 that backs up data stored in the SSD memory disk unit in the backup storage unit, according to an instruction from the host or when an error occurs in the power transmitted from the host; and a redundant array of independent disks (RAID) controller 800 coupled to SSD memory disk unit 100, controller 300, and internal backup controller 700.

The SSD memory disk unit 100 includes a plurality of memory disks provided with a plurality of volatile semiconductor memories for high-speed data input/output (for example, DDR, DDR2, DDR3, SDRAM, and the like), and inputs and outputs data according to the control of the controller 300. The SSD memory disk unit 100 may have a configuration in which the memory disks are arrayed in parallel.

The PCI-Express host interface unit 200 interfaces between a host and the SSD memory disk unit 100. The host may be a computer system or the like, which is provided with a PCI-Express interface and a power source supply device.

The controller unit 300 adjusts synchronization of data signals transmitted/received between the PCI-Express host interface unit 200 and the SSD memory disk unit 100 to control a data transmission/reception speed between the PCI-Express host interface unit 200 and the SSD memory disk unit 100.

As depicted, a PCI-e type RAID controller 800 can be directly coupled to any quantity of SSD memory disk units 100. Among other things, this allows for optimum control of SSD memory disk units 100. Among other things, the use of a RAID controller 800:

1. Supports the current backup/restore operations.
2. Provides additional and improved backup function by performing the following:
    a) the internal backup controller 700 determines the backup (user's request order or the status monitor detects power supply problems);
    b) the internal backup controller 700 requests a data backup to SSD memory disk units;
    c) the internal backup controller 700 requests internal backup device to backup data immediately;
    d) the internal backup controller 700 monitors the status of the backup for the SSD memory disk units and internal backup controller; and
    e) the internal backup controller 700 reports the internal backup controller's status and end-op.
3. Provides additional and improved restore function by performing the following:
    a) the internal backup controller 700 determines the restore (user's request order or the status monitor detects power supply problems);
    b) the internal backup controller 700 requests a data restore to the SSD memory disk units;
    c) the internal backup controller 700 requests an internal backup device to restore data immediately;
    d) the internal backup controller 700 monitors the status of the restore for the SSD memory disk units and internal backup controller; and
    e) the internal backup controller 700 reports the internal backup controller status and end-op.

Figure 2:
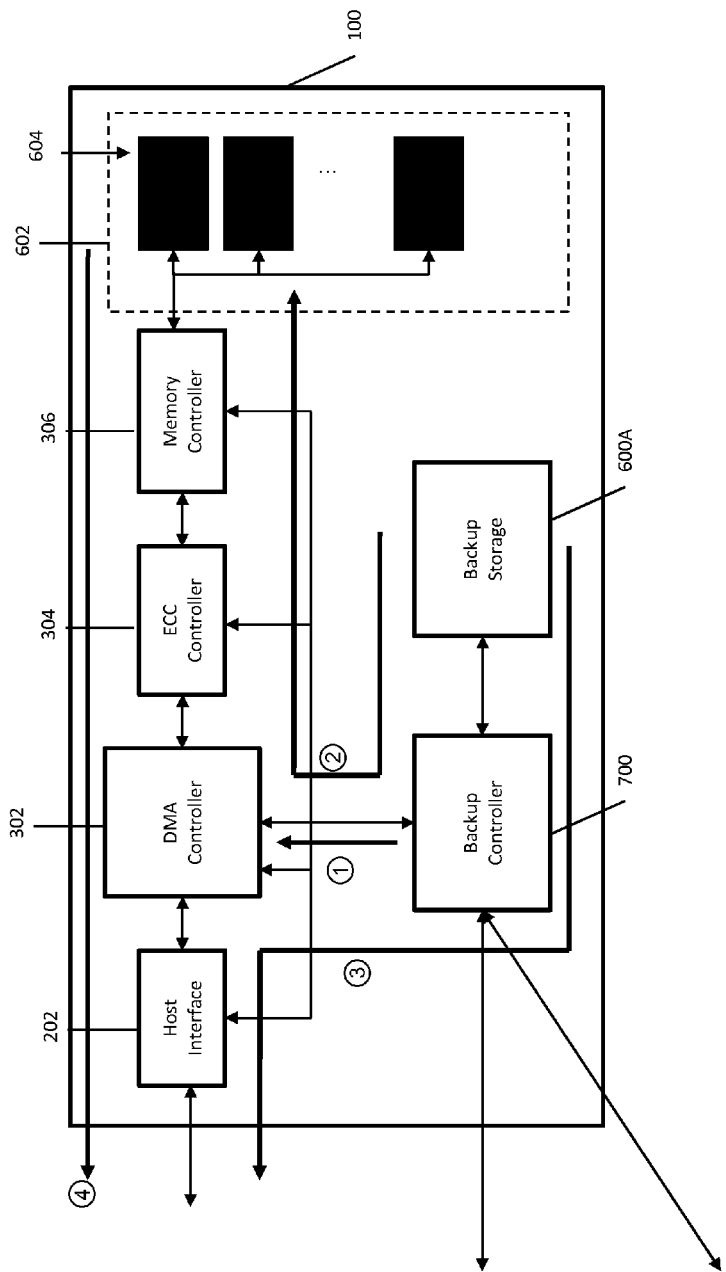
FIG. 2 is a diagram of the high-speed SSD of FIG. 1 according to an embodiment of the present invention.

Referring now to FIG. 2, a diagram schematically illustrating a configuration of the high-speed SSD 100 is shown. As depicted, SSD memory disk unit 100 comprises: a host interface 202 (e.g., PCI-Express host) (which can be interface 200 of FIG. 1, or a separate interface as shown); a Direct Memory Access (DMA) controller 302 interfacing with a backup control module 700; an ECC controller 304; and a memory controller 306 for controlling one or more blocks 604 of memory 602 that are used as high-speed storage. Also shown are backup controller 700 coupled to DMA controller 302 and backup storage unit 600A coupled to backup controller 700. In general, these components will be leveraged to provide a warm-booting operation whereby data restore operations can be done when the underlying device is powered on. This eliminates any need to wait until the host requests the restore operation. Resultantly, data restoration restore can be done by the boot disk and data can be accessed during the restoration process. In general, the following method provides this functionality. When the system is powered on, backup controller 700 send a notification to the DMA Controller 302 that data restoration is needed. Then, backup controller 700 automatically restores the needed contents from backup storage unit 600A to blocks 604 of memory 602. During the restoration process, when the host requests data, the DMA Controller 302 reads the data from the backup storage 600A and sends the read data to the host. Finally, when the restoration is complete, normal operations start.

In general, DMA is a feature of modern computers and microprocessors that allows certain hardware subsystems within the computer to access system memory for reading and/or writing independently of the central processing unit. Many hardware systems use DMA including disk drive controllers, graphics cards, network cards, and sound cards. DMA is also used for intra-chip data transfer in multi-core processors, especially in multiprocessor system-on-chips, where its processing element is equipped with a local memory (often called scratchpad memory) and DMA is used for transferring data between the local memory and the main memory. Computers that have DMA channels can transfer data to and from devices with much less CPU overhead than computers without a DMA channel. Similarly, a processing element inside a multi-core processor can transfer data to and from its local memory without occupying its processor time and allowing computation and data transfer concurrency.

Without DMA, using programmed input/output (PIO) mode for communication with peripheral devices, or load/store instructions in the case of multi-core chips, the CPU is typically fully occupied for the entire duration of the read or write operation, and is thus unavailable to perform other work. With DMA, the CPU would initiate the transfer, do other operations while the transfer is in progress, and receive an interrupt from the DMA controller once the operation has been done. This is especially useful in real-time computing applications where not stalling behind concurrent operations is critical.

Figure 3:
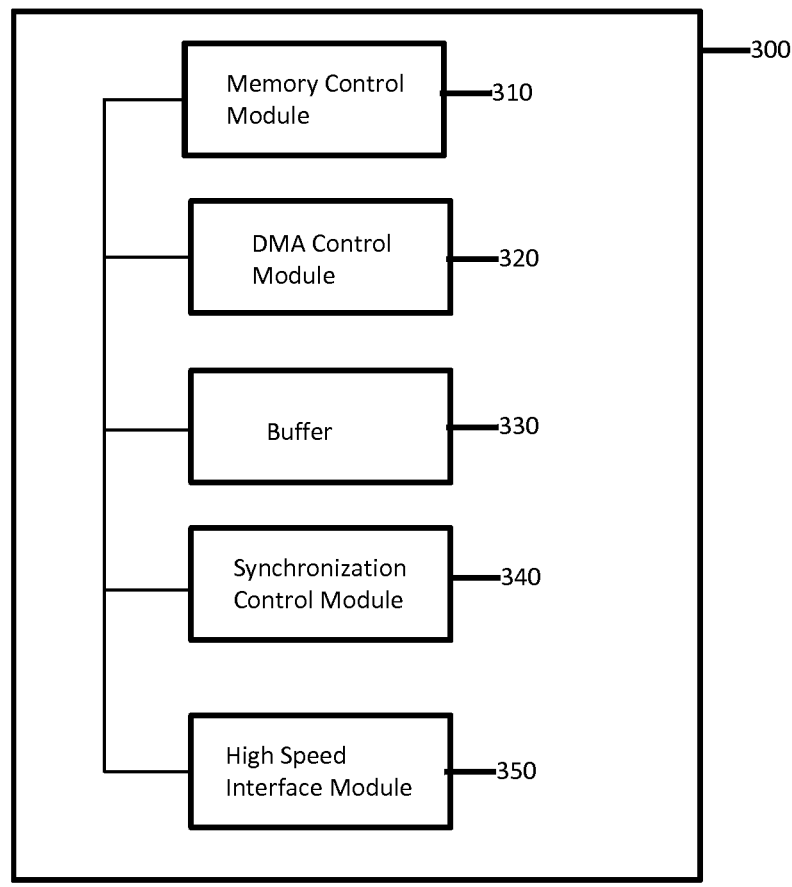
FIG. 3 is a diagram illustrating a configuration of a controller unit in FIG. 1 according to an embodiment of the present invention.

Referring now to FIG. 3, the controller unit 300 of FIG. 1 is shown as comprising: a memory control module 310 which controls data input/output of the SSD memory disk unit 100; a DMA control module 320 which controls the memory control module 310 to store the data in the SSD memory disk unit 100, or reads data from the SSD memory disk unit 100 to provide the data to the host, according to an instruction from the host received through the PCI-Express host interface unit 200; a buffer 330 which buffers data according to the control of the DMA control module 320; a synchronization control module 340 which, when receiving a data signal corresponding to the data read from the SSD memory disk unit 100 by the control of the DMA control module 320 through the DMA control module 320 and the memory control module 310, adjusts synchronization of a data signal so as to have a communication speed corresponding to a PCI-Express communications protocol to transmit the synchronized data signal to the PCI-Express host interface unit 200, and when receiving a data signal from the host through the PCI-Express host interface unit 200, adjusts synchronization of the data signal so as to have a transmission speed corresponding to a communications protocol (for example, PCI, PCI-x, or PCI-e, and the like) used by the SSD memory disk unit 100 to transmit the synchronized data signal to the SSD memory disk unit 100 through the DMA control module 320 and the memory control module 310; and a high-speed interface module 350 which processes the data transmitted/received between the synchronization control module 340 and the DMA control module 320 at high speed. Here, the high-speed interface module 350 includes a buffer having a double buffer structure and a buffer having a circular queue structure, and processes the data transmitted/received between the synchronization control module 340 and the DMA control module 320 without loss at high speed by buffering the data and adjusting data clocks.

Figure 4:
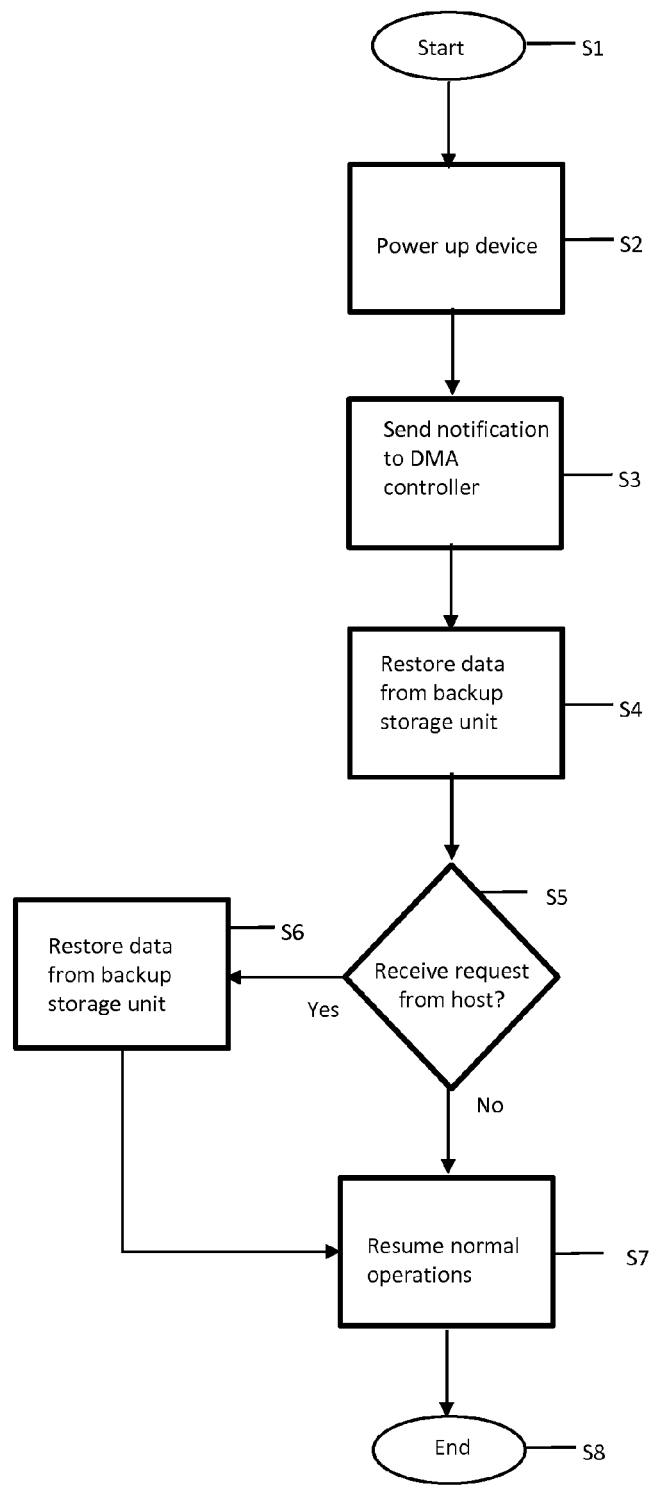
FIG. 4 is a method flow diagram according an embodiment of the present invention.

Referring now to FIG. 4, a method flow diagram according to an embodiment of the present invention is shown. As depicted, the process is started in step S1, and the SSD memory disk unit is powered up in step S2. In step S3, a notification is sent from a backup controller to a DMA controller indicating that data restoration is needed. In step S4, data is automatically restored from a backup storage unit coupled to the backup controller in response to the notification. The restoration typically occurs to a set of blocks of semiconductor memories. In step S5, it is determined whether a request is received from a host for the data. If so, the data is sent from the DMA controller to the host (via a host interface) in response thereto in step S6. In either event, after the data has been sent from the DMA controller to the host (or after the data has been restored to the blocks of memory) normal operations can be resumed in step S7, and the process ended in step S8.

Referring back to FIG. 1, auxiliary power source unit 400 may be configured as a rechargeable battery or the like, so that it is normally charged to maintain a predetermined power using power transferred from the host through the PCI-Express host interface unit 200 and supplies the charged power to the power source control unit 500 according to the control of the power source control unit 500.

The power source control unit 500 supplies the power transferred from the host through the PCI-Express host interface unit 200 to the controller unit 300, the SSD memory disk unit 100, the backup storage unit 600A-B, and the backup control unit 700.

In addition, when an error occurs in a power source of the host because the power transmitted from the host through the PCI-Express host interface unit 200 is blocked, or the power transmitted from the host deviates from a threshold value, the power source control unit 500 receives power from the auxiliary power source unit 400 and supplies the power to the SSD memory disk unit 100 through the controller unit 300.

The backup storage unit 600A-B is configured as a low-speed non-volatile storage device such as a hard disk and stores data of the SSD memory disk unit 100.

The backup control unit 700 backs up data stored in the SSD memory disk unit 100 in the backup storage unit 600A-B by controlling the data input/output of the backup storage unit 600A-B and backs up the data stored in the SSD memory disk unit 100 in the backup storage unit 600A-B according to an instruction from the host, or when an error occurs in the power source of the host due to a deviation of the power transmitted from the host deviates from the threshold value.

The storage device of a serial-attached small computer system interface/serial advanced technology attachment (PCI-Express) type supports a low-speed data processing speed for a host by adjusting synchronization of a data signal transmitted/received between the host and a memory disk during data communications between the host and the memory disk through a PCI-Express interface, and simultaneously supports a high-speed data processing speed for the memory disk, thereby supporting the performance of the memory to enable high-speed data processing in an existing interface environment at the maximum.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for semiconductor storage device (SSD)-based data restoration, comprising:
    a host interface unit;
    sending a notification from a backup controller to a DMA controller indicating that data restoration is needed, the notification occurring in response to a powering on of a SSD memory disk unit;
    automatically restoring data from a backup storage unit coupled to the backup controller in response to the notification; and
    while automatically restoring the data, sending the data from the DMA controller to a host in response to a request received from the host.

2. The method of claim 1, further comprising starting a normal operation of the SSD memory disk unit after the data has been sent from the DMA controller to the host.

3. The method of claim 1, the SSD memory disk unit comprising the DMA controller.

4. The method of claim 3, the SSD memory disk unit further comprising:
    a host interface coupled to the DMA controller; and
    an ECC controller coupled to the DMA controller.

5. The method of claim 4, the SSD memory disk unit further comprising:
    a memory controller coupled to the ECC controller; and
    a set of blocks of memory coupled to the memory controller wherein automatically restoring comprises automatically restoring the data to the set blocks of memory.

6. The method of claim 1, further comprising a power source control unit and an auxiliary power source coupled to the backup controller.

7. The method of claim 1, further comprising sending the data from the backup controller to the DMA controller.

8. A semiconductor storage device (SSD) memory disk unit, comprising:
    a host interface for coupling the SSD memory disk unit to a host;
    a DMA controller coupled to the host interface;
    a backup controller coupled to the DMA controller; and
    a backup storage unit coupled to the backup controller, wherein a notification is communicated from the backup controller to the DMA controller upon a powering-on of the SSD memory disk unit, and wherein the backup controller automatically restores data from the backup storage unit in response to the notification, and wherein while automatically restoring the data, the DMA controller sends the data to the host in response to a request received from the host.

9. The SSD memory disk unit of claim 8, further comprising an ECC controller coupled to the DMA controller.

10. The SSD memory disk unit of claim 9, further comprising:
    a memory controller coupled to the ECC controller; and
    a set of blocks of memory coupled to the memory controller wherein the backup controller automatically restores the data from the backup storage unit to the set of blocks of memory.

11. The SSD memory disk unit of claim 10, the set of blocks of memory comprising semiconductor blocks of memory.

12. The SSD memory disk unit of claim 8, wherein the DMA controller sends the data to the host via the host interface in response to a request for the data from the host.

13. A semiconductor storage device (SSD)-based system, comprising:
    at least one SSD memory disk unit comprising a DMA controller, a backup controller coupled to the DMA controller, and a backup storage unit coupled to the backup controller;
    a RAID controller coupled to the at least one SSD memory disk unit; and
    a controller coupled to the RAID controller, wherein a notification is communicated from the backup controller to the DMA controller upon a powering-on of the at least one SSD memory disk unit, and wherein the backup controller automatically restores data from the backup storage unit in response to the notification, and wherein while automatically restoring the data, the DMA controller sends the data to a host in response to a request received from the host.

14. The SSD-based system of claim 13, the at least one SSD memory disk unit further comprising an ECC controller coupled to the DMA controller.

15. The SSD-based system of claim 14, the at least one SSD memory disk unit further comprising:
    a memory controller coupled to the ECC controller; and
    a set of blocks of memory coupled to the memory controller wherein the backup controller automatically restores the data from the backup storage unit to the set of blocks of memory.

16. The SSD based system of claim 15, the set of blocks of memory comprising semiconductor blocks of memory.

17. The SSD based system of claim 13, wherein the DMA controller sends the data to a host via a host interface in response to a request for the data from the host.

* * * * *